United States Patent
Budzich et al.

[15] 3,656,689
[45] Apr. 18, 1972

[54] MODULATING VALVE

[72] Inventors: Tadeusz Budzich, Moreland Hills; Hiralal V. Patel, Cleveland, both of Ohio

[73] Assignee: The Weatherhead Company, Cleveland, Ohio

[22] Filed: Dec. 16, 1970

[21] Appl. No.: 98,595

[52] U.S. Cl. ................................237/8, 137/501, 236/79, 236/92 R
[51] Int. Cl. ........................................F24d 3/02, B60h 1/08
[58] Field of Search ..................236/92; 137/501; 237/2, 8

[56] References Cited

UNITED STATES PATENTS 2,743,872  5/1956  Wood et al. ..........................236/92 R
2,848,169  8/1958  Obermaier ..........................237/8 A X
2,856,132  10/1958  Chace ..................................237/8 A Primary Examiner—Edward J. Michael
Attorney—McNenny, Farrington, Pearne and Gordon

[57] ABSTRACT

A vehicle heater control system is disclosed which includes a flow control valve in which pressure regulating means provide a constant pressure drop across a metering valve to insure accurate flow rates. The metering valve is adjustably positioned by a vacuum suspension system. The vehicle operator controls the position of the metering valve and the flow rate therethrough by controlling the valve of a control vacuum supplied to the metering valve actuator.

15 Claims, 5 Drawing Figures

PATENTED APR 18 1972 3,656,689

INVENTORS
TADEUSZ BUDZICH,
HIRALAL V. PATEL
BY
McNENNY, FARRINGTON, PEARNE & GORDON

ATTORNEYS

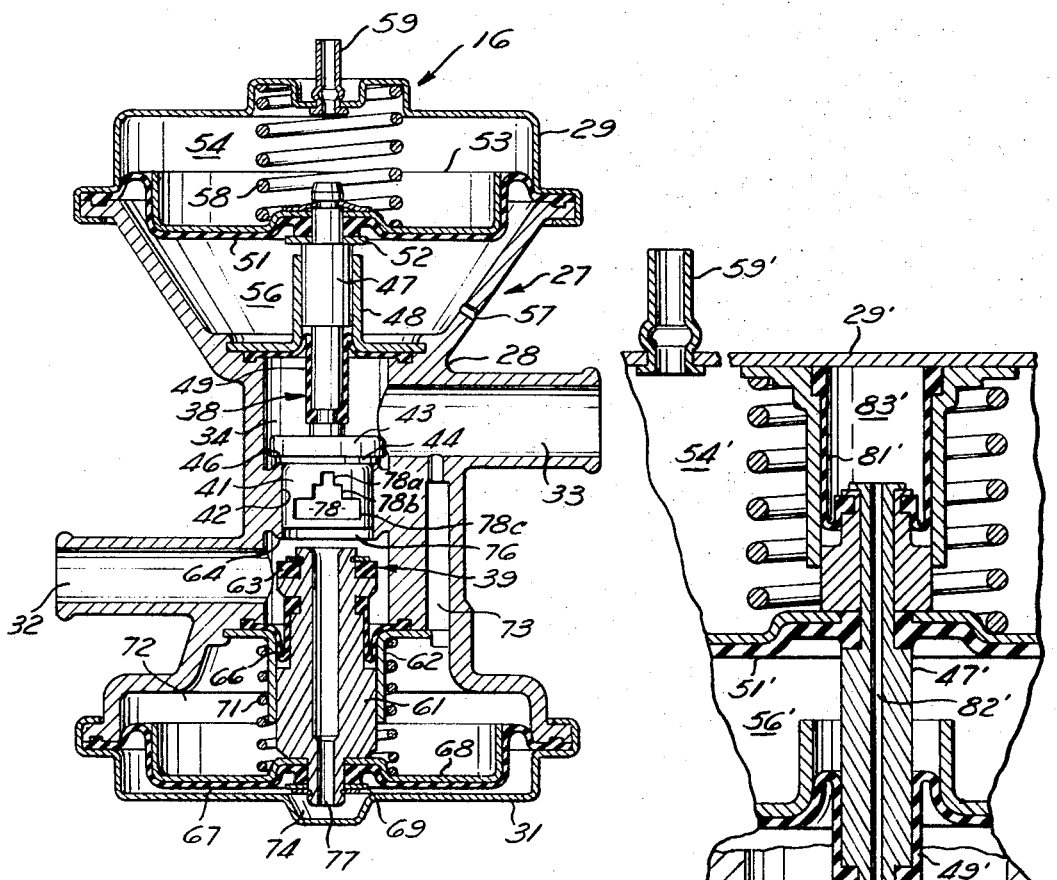
Fig. 3
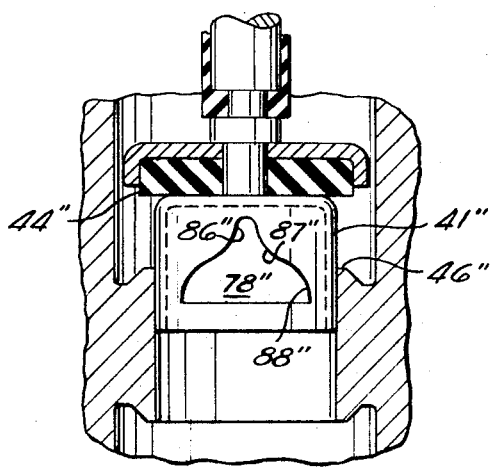
Fig. 5
Fig. 4
INVENTORS
TADEUSZ BUDZICH,
& HIRALAL V. PATEL
BY
McNENNY, FARRINGTON, PEARNE & GORDON
ATTORNEYS

MODULATING VALVE

BACKGROUND OF THE INVENTION

This invention relates generally to automotive heater control systems and more particularly to a novel and improved flow control valve and to a heater system incorporating such valve.

PRIOR ART

Heater systems for controlling the temperature in the passenger compartment of automobiles and trucks generally include a heat exchanger which is supplied with hot water or the like from the engine cooling system. The output of such heater is often controlled by means of a throttling valve in the heater circuit which is adjusted by the driver to regulate the flow of hot water through the heater.

In most prior art systems changes in the pressure of the hot water supply created by changes in the speed of the engine driven pump or the operation of the engine temperature control thermostat create changes in the flow rate through the heater even though the position of the throttling control valve is not changed. Such uncontrolled changes in the flow rate, of course, produce uncontrolled changes in the heater output. Such changes are particularly troublesome in systems combining the heater with air-conditioning in which the control of the air-conditioned temperature is maintained by the heater.

SUMMARY OF THE INVENTION

In accordance with the present invention, a novel and improved automotive heater control system is provided in which the flow through the heater and in turn the output of the heater is virtually unaffected by changes of the pressure in the engine cooling system. With the illustrated system, the flow rate through the heater is determined solely by the position of the metering valve which in turn is controlled by the driver. Consequently, once the driver sets the control to provide the desired amount of heater output, such output is maintained even though the supply pressure of the engine cooling water may vary widely.

In the illustrated embodiments a flow control valve is provided which combines a controllable metering valve and automatic pressure regulating means which function to maintain a predetermined constant pressure drop across the metering valve, regardless of the variations in supply pressure from the engine cooling system. The metering valve position is controlled and adjusted by the driver. Since the pressure drop across the metering valve is substantially constant, a constant flow is achieved for a given metering valve setting.

In the illustrated embodiments the metering valve is vacuum suspended, and its position is a function of and is controlled by the amount of operating vacuum supplied thereto. The source of vacuum is the engine manifold and the driver is provided with a vacuum control valve, usually mounted on the vehicle dashboard, which is adjusted by the driver. Adjustment of this valve changes the amount of vacuum supplied to the flow control valve and adjustably determines the position of metering valve. Consequently, the position of the metering valve is a function of the setting of the vacuum control valve.

The illustrated embodiments are particularly suitable for use in a system combining a heater coil with the evaporator coil of an air-conditioning system. In this combination the air-conditioner is often arranged to run constantly whenever any cooling is desired, and the cooled air from the air-conditioning evaporator is heated by the heater an amount necessary to achieve the desired passenger compartment temperature.

During operation wherein cooled air is heated before it is delivered to the passenger compartment, relatively small amounts of heat are required, and, consequently, relatively low flow rates through the heater coil are necessary. The flow control valve of this invention is arranged so that the change in flow rate of heating liquid is small compared to changes in control vacuum when low flow rates are desired, but the rate of change of liquid flow through the valve increases with respect to changes in control vacuum when higher flow rates are required. With such a system extreme accuracy of flow rate control is achieved in the low flow rate range normally used when the system is functioning to provide cooling. However, the sensitivity is not as great in the high flow rate ranges which occur when substantial heating is required from the system.

BRIEF DESCRIPTION OF THE DRAWINGS

FIG. 3 is a section of one embodiment of a flow control valve for use in the system of FIG. 1;

FIG. 4 is an enlarged fragmentary section of a second embodiment of the control valve; and FIG. 5 is an enlarged fragmentary section of a modified form of metering cup which may be used in the valves illustrated in either FIGS. 3 or 4.

DETAILED DESCRIPTION OF THE DRAWINGS

Figure 1:
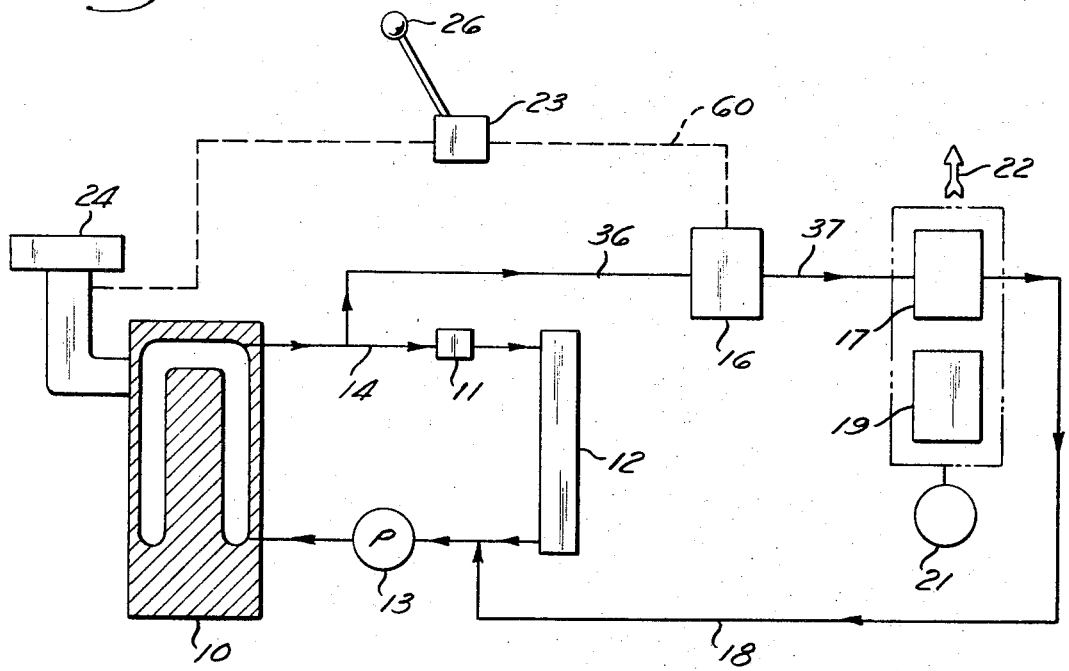
FIG. 1 is a schematic representation of an automotive heating and air-conditioning system in accordance with this invention.

FIG. 1 illustrates a preferred heater system incorporating this invention in which the vehicle engine jacket 10 is cooled by cooling liquid circulated through a thermostat 11 and a radiator 12 by an engine driven circulating pump 13. The thermostat 11 automatically functions to control the temperature of the engine by throttling the flow of cooling liquid to the radiator 12. The pump 13, because it is directly driven by the engine, operates at a speed which varies with engine speed. Since the pump speed varies widely and since the throttling produced by the thermostat 11 varies, the pressure in the line 14 between the thermostat 11 and the engine cooling jacket 10 varies widely as the engine operates.

The heater circuit includes a heater flow control valve 16 connected to the line 14 ahead of the thermostat 11 and a heater coil 17 through which the hot water flows before it returns to the engine cooling system through the line 18 which is connected between the radiator 12 and the inlet of the pump 13. In the illustrated embodiment the heater coil 17 is adjacent to an evaporator coil 19 of an air-conditioning unit, and a fan 21 is provided to blow air, first over the evaporator 19, subsequently over the heater coil 17 and into the passenger compartment of the vehicle as illustrated by the arrow 22.

A reduced pressure control signal or control vacuum is supplied to the flow control valve 16 by a vacuum control valve 23 which is mounted on the vehicle dashboard for access and operation by the driver. The source of vacuum is the engine manifold 24. Movement of a handle 26 on the vacuum control valve 23 permits the operator to adjust the value of the control vacuum supplied to the flow control 16. Thus the driver, by adjusting the handle 26, determines the absolute value of the vacuum supplied to the flow control valve 16 and in turn controls the flow rate through the heater coil 17. Preferably, means are provided to compensate for variations in manifold vacuum created by changes in engine throttle settings so that the output or control vacuum approaches an absolute value which is a direct function of the position of the control lever 26. Alternatively, the vacuum control valve 23 may be provided with means to compensate for variations in the manifold vacuum. However, the illustrated system is arranged so that the effect of variation in control vacuum resulting from variations in supply vacuum is minimized.

FIG. 3 illustrates a first embodiment of the flow control valve 16. This embodiment is provided with a body assembly 27 which includes a main body member 28 and upper and lower body caps 29 and 31. The main body member is provided with a flow passage therethrough which includes an inlet passage 32 and an outlet passage 33, both of which open into a vertical passage 34. When installed in the system, the inlet passage 32 is connected through a line 36 (illustrated in FIG. 1) to the line 14 ahead of the thermostat 11, and the outlet passage 33 is connected through a line 37 to the heater coil 17.

Mounted within the body assembly 27 are a metering valve assembly 38 and a pressure regulating valve assembly 39. The metering valve assembly includes a cup-shaped metering valve element 41 which extends into and closely fits a central portion 42 in the vertical passage 34, and a closure member 43 provided with an elastomeric seal 44 which is engagable with a seat 46 to positively prevent flow between the inlet 32 and the outlet 33. The metering valve element 41 and the closure member 43 are secured to the lower end of a valve stem 47 which is guided within a sleeve guide 48 for vertical movement with respect to the body assembly. A roll seal 49 of the type which does not change in effective area as the stem 47 moves is connected between the body member 28 and the valve stem 47 to prevent leakage up along the valve stem. The roll seal is secured in position by the sleeve guide 48.

Mounted in the upper portion of the body assembly between the upper end of the main body member 28 and the upper cap 29 is a flexible diaphragm 51 formed of a suitable elastomeric material. The periphery of the diaphragm 51 is sealingly mounted between the upper cap 29 and the body 28, and the central portion is mounted on the upper end of the valve stem 47 between a washer 52 and a metallic diaphragm cup member 53 so as to provide a fluid seal with the upper end of the valve stem 47. The diaphragm 52 divides the body assembly into a vacuum chamber 54 and a reference or atmosphere chamber 56 which is connected to atmosphere through a vent 57. A coil spring 58 extends between the diaphragm cup 53 and the upper cap 29 and produces a resilient force urging the diaphragm and in turn the valve stem 47 in a downward direction tending to cause engagement between the seal 43 and the seat 46. A tube fitting 59 is mounted on the upper cover 29 for connecting a vacuum line 60 (illustrated in FIG. 1) to the vacuum chamber 54.

The actual metering performed by the metering valve element 41 occurs when this element is lifted upward to a position in which a shaped orifice 78 formed in the valve element 41 cooperates with the inner edge of the valve seat 46 to provide a flow orifice having an area which varies with the position of the valve element 41 in a manner discussed in more detail below.

The pressure regulating valve assembly 39 includes a valve stem 61 guided for vertical movement within a sleeve guide 62. Mounted on the upper end of the valve stem 61 is an elastomeric seal 63 which is movable into and out of engagement with a valve seat 64 at the lower end of the central portion 42. Here again, a roll seal 66 is provided between the body 28 and the sleeve guide 62 to prevent flow down along the valve stem 61. Movement of the valve stem 61 is controlled by a second flexible diaphragm 67 formed of a suitable elastomeric material. The diaphragm 67 is sealingly mounted at its periphery between the lower cap 31 and the body 28 and is mounted at its center at the lower end of the valve stem 61 between a diaphragm cup 68 and a washer 69.

A spring 71 extends between the sleeve guide 62 and the diaphragm cup and urges the valve stem 61 in a downward direction away from the seat 64. The diaphragm 67 functions to divide the cavity formed by the lower cap 31 and the body 28 into a first chamber 72 connected to the outlet 33 by a passage 73, and a second chamber 74 connected to an intermediate zone 76 by a passage 77 through the valve stem 61. The intermediate zone 76 is the zone between the two valves and is downstream from the pressure regulating valve assembly 39 and upstream from the metering valve assembly 38.

The elements of the flow control valve assume the position illustrated in FIG. 3 when the engine of the vehicle is not operating. At this time, the cooling liquid is not pressurized, and there is no vacuum control signal. Under such conditions the spring 71 maintains the regulating valve assembly in the fully open position, and the spring 58 maintains the metering valve assembly closed. Under this condition the pressures in the two chambers 54 and 56 are atmospheric pressure, and the pressures on the two sides of the diaphragm 67 in the chambers 72 and 74 are equal at substantially atmospheric pressure. When the engine is started, the cooling liquid is pressurized by the pump 13 so liquid under pressure is supplied to the inlet 32. This pressure is communicated to the chamber 74 through the passage 77. However, since the metering valve is closed by the seating of the seal 43 on the seat 46, such pressure does not reach the chamber 72. When the differential pressure between the two chambers reaches a sufficiently high value to produce an upward force on the diaphragm and in turn the valve stem 61 to overcome the spring 71, the seal 63 seats against the seat 64. This occurs when a differential pressure exists between the intermediate zone 76 and the outlet 33 which is equal to the predetermined differential pressure that is maintained between these zones by the regulating valve assembly 39. For purposes of analysis, it can be assumed that the pressure drop occurring between the inlet 32 and the intermediate zone occurs at the valve seat 64, both when the regulating valve is closed and when it is functioning to regulate flow.

The effective area over which the pressure in the intermediate zone acts is equal to the total effective area of the diaphragm 67 minus the area within the valve seat 64, because the liquid within the intermediate zone is acting in a downward direction within this seat 64 while the entire surface of the diaphragm is acted on in an upward direction by the liquid in the chamber 74. The effective area of the liquid at the outlet pressure contained in the chamber 72 is equal to the total effective area of the diaphragm 72 minus the effective area of the roll seal 66. This is because the liquid in the chamber 73 is acting downwardly on the diaphragm 67 and upwardly on the seal 66. The effective area of the roll seal 66 is selected to be equal to the area within the valve seat 64. When this relationship exists, the effective area of the liquid within the chamber 72 acting in a downward direction is equal to the effective area of the liquid at the pressure of the intermediate zone 76, so the regulator is fully balanced with respect to area.

Because the effective areas of the liquids at the two pressures in the chambers 72 and 74 are equal, the pressure induced forces created by differential pressures on opposite sides of the diaphragm are a direct and linear function of the values of the differential pressure. The spring 71 is selected to provide a low spring rate. Consequently, the spring force on the regulating valve is substantially constant even when the valve moves between the fully closed position and the regulating position. It should be noted that the effective area of the liquid at inlet pressure in the inlet 32 acting on the regulating valve is zero because the roll seal 66 has the same effective area as the seat 64. With this structure very accurate pressure regulation is achieved, and the regulating valve maintains a predetermined pressure differential between the intermediate zone 76 and the outlet 33 whenever the pressure in the inlet 32 exceeds the outlet pressure by more than the predetermined differential pressure. Of course, the absolute value of the differential pressure is determined by the force of the spring 71 and its relationship to the effective areas of the fluid in the two chambers 72 and 74.

When a controlling vacuum is supplied to the chamber 54 through the tube fitting 59, a differential in pressure exists between the two chambers 54 and 56. When the force resulting from this differential is sufficiently large, it overcomes the action of the spring 58 and lifts the seal 43 off of the seat 46. In the embodiment of FIG. 3 the effective areas of the fluids in the two chambers 54 and 56 are not equal. The fluid in the chamber 54, even though it is at a vacuum, is at a positive absolute pressure and acts over the entire effective area of the diaphragm 51 producing a force in a downward direction. However, the atmospheric air in the chamber 56 acts over an effective area equal to the effective area of the diaphragm minus the effective area of the roll seal 49. Since the effective area of the roll seal 49 is small when compared to the effective area of the diaphragm 51, its affect on the system is small.

The pressure of the fluid in the outlet 33 acts in a downward direction on the valve element over an effective area equal to the area within the seat 46 and in an upward direction over an area equal to the effective area of the roll seal 49. However, since the pressure in the outlet 33 is relatively constant and relatively low, the forces on the metering valve created by the liquid at outlet pressure are substantially constant. During operation of the system, the pressure in the intermediate zone 76, because of the action of the regulating valve assembly 39, is greater than the pressure in the outlet by a constant predetermined amount. Therefore, the upward force on the metering valve assembly resulting from the fluid under pressure in the intermediate zone 76 acting on the area within the valve seat 46 in an upward direction is substantially constant. Consequently, the position to which the metering valve assembly 38 moves is determined almost completely by the value of the control vacuum supplied to the chamber 54 and is a direct function of the absolute value of the control vacuum and the spring rate of the spring 58.

The spring 58 is selected to provide a sufficient force to insure that the seal 44 will seat on the valve seat 46 and provide a positive seal therebetween whenever a control vacuum is not supplied to the chamber 54 and when such chamber is at atmospheric pressure. This need not be an excessive force, however, since the maximum liquid produces force on the metering valve is determined by the pressure differential between the intermediate zone and the outlet 33 and is substantially constant as mentioned above. Since a positive seal is provided by the metering valve between the intermediate zone 76 and the outlet 33 when a control vacuum is not supplied to the chamber 54, the regulating valve positively prevents leakage of liquid through the heater coil 17 under such condition. This is true even if relatively high pressures exist at the inlet since any tendency for the pressure to build up within the intermediate zone 76 causes an increase in the closing force on the regulating valve and insures that leakage does not occur into the intermediate zone regardless of the pressure in the inlet 32.

Figure 2:
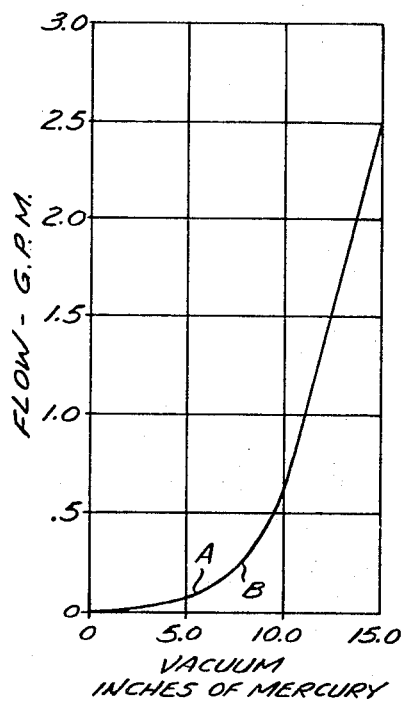
FIG. 2 is a graph showing the flow through the heater provided by the illustrated embodiments for various values of control vacuum.

The flow rate trough the metering valve is determined by the position of the orifice 78 with respect to the seat 46. Since a constant pressure drop is always present across the metering valve under operating conditions, variations in the pressure in the inlet 32 do not produce variations in flow. In the embodiment illustrated in FIG. 3, the orifice 78 is a stepped orifice having an upper section 78a of small area, an intermediate section 78b of increased area, and a lower section 78c of the largest area. With this structure the change of rate of flow through the orifice created by changes in the position of the metering valve are small when only the upper section 78a is above the seat 46. The rate of change of flow with change of metering valve position, however, increases when the intermediate portion 78b of the orifice comes into operation. Finally, the rate of change of flow with changes of metering valve position is at a maximum when the lowest section 78c of the orifice becomes effective. With a metering valve orifice of this type, a flow curve as set forth in FIG. 2 is approximated wherein changes in the value of absolute vacuum produce relatively small changes in flow for the low ranges of flow as illustrated by the curve between zero and the point "A." Between the points "A" and "B," the rate of change of flow with respect to changes in control vacuum increase because the intermediate portion 78b of the orifice is active. For higher rates of flow, when the wide lower portion 78c of the orifice is active, the change in rate of flow compared to changes in control vacuum is high. An orifice of the type illustrated in FIG. 3 does not produce a completely smooth curve as illustrated in FIG. 2 but does produce a flow curve which approximates the curve of FIG. 2 and approximates an exponential type flow relationship. As used herein, an exponential flow relationship or flow curve with respect to control vacuum is intended to include the type of flow illustrated in FIG. 2 and approximated by the embodiment of FIG. 3.

Because the change in the rate of flow with respect to changes in control vacuum is small in the low flow range, very accurate flow control is obtained in this range even if the value of the control vacuum supplied to the flow control valve varies due to changes in the manifold vacuum which is the source of the control vacuum. Consequently, accuracy of control is maintained under the conditions wherein the heating liquid flowing through the heater coil 17 is used to control the temperature during air-conditioning operation. It is recognized that such variations in the control vacuum will produce greater variations in flow through the coil 17 under high flow conditions, but accuracy of regulation is not as important under such conditions in which substantial heat output is required to maintain passenger compartment comfort.

FIG. 4 discloses an embodiment in which the effective areas over which the fluids in the chambers 54' and 56' act are equal. In this embodiment the regulating valve assembly 39' remains the same as illustrated in FIG. 3. However, the actuating mechanism for the metering valve is modified to provide full balancing of the effective areas of the fluid forces in the vacuum chamber and the atmospheric chamber. In this embodiment similar reference numerals are utilized to designate similar parts with a prime (') added to indicate that reference is being made to the embodiment of FIG. 4. In this embodiment the valve stem 47' extends up through the diaphragm 51' and is connected at its upper end to a roll seal 81'. The roll seal 81' also provides a seal with the upper cap 29'. The valve stem 47' is provided with a central passage 82' which provides communication between the intermediate zone 76' and an upper chamber 83' to maintain the upper chamber 83' at the same pressure as the intermediate zone 76'. The roll seal 81' is selected to have the same effective area as the roll seal 49'. Consequently, the fluid in the vacuum chamber 54' acts in a downward direction on the effective area of the diaphragm 51' and in an upward direction on the effective area of the roll seal 81'. The effective area of the vacuum chamber 54' is therefore equal to the effective area of the diaphragm 51' minus the effective area of the roll seal 81'. This is equal to the effective area of the fluid in the atmospheric chamber 56'.

The action of the fluid in the chamber 83' is in a downward direction and tends to balance the upward force of the fluid in the intermediate zone 76'. Here again, however, the resulting force of the fluid at the pressure at the intermediate zone 76' is substantially constant since the pressure in this zone is substantially constant under operating conditions. With this embodiment greater position accuracy of the metering valve with respect to control vacuum supplied to the vacuum chamber 54' through the fitting 59' is achieved because the effective areas over which the fluid in the two chambers 54' and 56' are equal.

In the embodiment in FIG. 5 a metering orifice is shaped to provide a smooth curve as illustrated in FIG. 2. In this embodiment a double prime (") is used to indicate reference to similar elements. The structure of the regulating valve assembly is identical with the embodiment of FIG. 3, and the vacuum responsive mechanism may be as illustrated in either FIG. 3 or FIG. 4. However, the metering valve element 41" is formed with an orifice 78" having a narrow upper section 86" which smoothly blends into an intermediate section 87" which in turn smoothly blends into a lower relatively wide section 88". By properly shaping the orifice 78", substantially any desired smooth curve of flow rate with respect to the metering valve position can be obtained since the metering valve position is a direct function of the absolute value of the control vacuum. In the embodiment of FIG. 5 the metering valve is shown in a flow condition in which the orifice 78" extends above the seat 46", and the seal 44" is spaced from the seat 46".

In each of the embodiments illustrated, a system is provided in which the metering valve is accurately positioned by the control vacuum determined by the vehicle operator and wherein a constant pressure drop is maintained across the metering valve. Consequently, variations in pressure of the cooling liquid supplied to the heater do not affect the flow rate through the valve, and heater operation is reliably maintained in the manner desired by the operator. Further, since the two seals 44 and 63 cooperate to insure that absolutely no flow occurs when a control vacuum is not supplied to the flow control valve, objectionable heat is not present when the operator closes the valve 23.

In accordance with the broader aspects of this invention, a flexible pull cable can be provided to connect the operator's control and the metering valve instead of the vacuum system illustrated. In such a system, however, a lost motion connection should be provided between the pull cable and the metering valve to insure that the maximum force applied to the seal 44 is determined by a spring which functions to resiliently bias the metering valve toward the closed position with a maximum force which is not sufficient to damage the seal. Such spring force, however, must be sufficiently great to insure closure of the metering valve against the differential pressure produced by the regulating valve.

Although preferred embodiments of this invention are illustrated, it is to be understood that various modifications and rearrangement of parts may be resorted to without departing from the scope of the invention disclosed and claimed herein.

What is claimed is:

1. A vehicle heating system comprising engine means producing a source of fluid at a substantially constant temperature and a varying pressure, a heater coil, control means connecting said coil and said source, said control means including an adjustable metering valve operable to control the rate of flow of fluid through said coil and pressure regulating means including a regulating valve connected in series with said metering valve operating to maintain a substantially constant pressure drop across said metering valve, said pressure drop having an absolute value less than the absolute value of the pressure of said fluid normally provided by said engine means.

2. A vehicle heating system as set forth in claim 1 wherein said metering valve is connected upstream from said coil and said pressure regulating valve is connected upstream from said metering valve.

3. A vehicle heating system as set forth in claim 1 wherein said metering valve is biased toward the closed position with a resilient force, said pressure drop urging said metering valve toward an opened position with a substantially constant pressure force, said resilient force being greater than said pressure force and sufficient to maintain said metering valve closed.

4. A vehicle heating system as set forth in claim 3 wherein said resilient force is provided by a spring, and operator control means are provided to move said metering valve against said spring to an operator selected adjusted position.

5. A vehicle heating system as set forth in claim 4 wherein said operator controlled means act only in a direction tending to open said metering valve.

6. A vehicle heating system as set forth in claim 5 wherein vacuum responsive means are connected to move said metering valve toward its open position to adjusted positions which are a direct function of the absolute value of the vacuum supply thereto, and said operator controlled means is operable to supply a control vacuum to said vacuum responsive means.

7. A vehicle heating system as set forth in claim 6 wherein said motor means provides a source of vacuum which varies in absolute value, and the flow through said control means approaches an exponential function of the absolute value of the vacuum supplied to said vacuum responsive means.

8. A flow control valve assembly for heaters and the like comprising a body providing an inlet, an outlet and a flow passage therebetween, a metering valve in said passage, a regulating valve in said passage in series with said metering valve, pressure responsive means connected to move said regulating valve and maintain a substantially constant pressure drop across said metering valve, said pressure drop tending to urge said metering valve toward an open position with a substantially constant pressure force, spring means urging said metering valve toward a closed position with a spring force which is greater than said pressure force, and operating means operating to overcome said spring force and urge said metering valve toward said open position and adjustably determine the position of said metering valve.

9. A flow control valve assembly as set forth in claim 8 wherein said operator means applies a control vacuum to said metering valve.

10. A flow control valve assembly as set forth in claim 9 wherein said control vacuum is adjustable and the position of said metering valve is a function of said control vacuum.

11. A flow control valve assembly as set forth in claim 8 wherein said operator means is responsive to vacuum, and said body includes a port through which control vacuum is supplied to said operator means.

12. A flow control valve assembly as set forth in claim 11 wherein said pressure responsive means and said operator means each include a flexible diaphragm.

13. A flow control valve assembly as set forth in claim 12 wherein said metering valve is arranged so that the flow therethrough is substantially an exponential function of the absolute value of the control vacuum supplied to said operator means.

14. A flow control valve assembly as set forth in claim 8 wherein said metering valve is provided with a soft valve element operable to positively prevent flow therethrough when said metering valve is in the closed position.

15. A flow control valve assembly as set forth in claim 14 wherein said regulating valve is provided with a soft valve element operable to positively prevent flow therethrough and prevent excessive pressure drop from occurring across said metering valve when said metering valve is closed.

* * * * *